United States Patent
Yamashita

(10) Patent No.: US 11,601,211 B2
(45) Date of Patent: Mar. 7, 2023

(54) TIME SYNCHRONIZATION SYSTEM, MASTER STATION, AND TIME SYNCHRONIZATION METHOD

(71) Applicant: Mitsubishi Electric Corporation, Tokyo (JP)

(72) Inventor: Akira Yamashita, Nagoya (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/783,014

(22) PCT Filed: Feb. 25, 2020

(86) PCT No.: PCT/JP2020/007300
§ 371 (c)(1),
(2) Date: Jun. 7, 2022

(87) PCT Pub. No.: WO2021/171329
PCT Pub. Date: Sep. 2, 2021

(65) Prior Publication Data
US 2023/0025680 A1     Jan. 26, 2023

(51) Int. Cl.
*H04J 3/06* (2006.01)
*H04L 7/04* (2006.01)
(52) U.S. Cl.
CPC .............. *H04J 3/0635* (2013.01); *H04L 7/04* (2013.01)
(58) Field of Classification Search
CPC .................. H04J 3/0635; H04L 7/04
See application file for complete search history.

(56) References Cited

U.S. PATENT DOCUMENTS 9,271,247 B1    2/2016   Pearson et al.
2005/0207387 A1   9/2005   Middleton et al.
(Continued)

FOREIGN PATENT DOCUMENTS

JP    2010-213101 A    9/2010
JP    2014-32055 A     2/2014
(Continued)

OTHER PUBLICATIONS

A. Ciuffoletti, "Collision avoidance for Delay_req messages in broadcast media," 2009 International Symposium on Precision Clock Synchronization for Measurement, Control and Communication, 2009, pp. 1-6, doi: 10.1109/ISPCS.2009.5340217. (Year: 2009).*

(Continued)

*Primary Examiner* — Gary Mui
(74) *Attorney, Agent, or Firm* — Xsensus LLP

(57) ABSTRACT

A time synchronization system includes a master station (100) and slave stations (200) communicably connected to the master station (100). The master station (100) includes a contention determiner (114) and a time synchronization frame processing unit (113). The contention determiner (114) determines, based on receipt timings of a plurality of first time synchronization frames transmitted from the respective slave stations (200), whether the plurality of first time synchronization frames have a possibility of contention over relay processing. The time synchronization frame processing unit (113) discards, when the contention determiner (114) determines that the plurality of first time synchronization frames have the possibility of the contention, out of first time synchronization frames that have a possibility of mutual contention, a first time synchronization frame received later.

6 Claims, 8 Drawing Sheets

(56) References Cited

U.S. PATENT DOCUMENTS

| | | | | |
|---|---|---|---|---|
| 2009/0067850 A1* | 3/2009 | Mizutani | ............... | H04J 3/0605 |
| | | | | 398/154 |
| 2012/0269204 A1 | 10/2012 | Zampetti | | |
| 2013/0266306 A1 | 10/2013 | Kozaki et al. | | |
| 2014/0064297 A1* | 3/2014 | Hirota | ................... | H04J 3/0667 |
| | | | | 370/412 |
| 2017/0373821 A1 | 12/2017 | Arakawa | | |

FOREIGN PATENT DOCUMENTS

| | | | |
|---|---|---|---|
| JP | 2017-92714 A | | 5/2017 |
| WO | 2012/108387 A1 | | 8/2012 |
| WO | 2016/147405 A1 | | 9/2016 |
| WO | WO2020/188703 A1 | * | 9/2020 |

OTHER PUBLICATIONS

International Search Report and Written Opinion dated Apr. 7, 2020, received for PCT Application PCT/JP2020/007300. Filed on Feb. 25, 2020, 9 pages including English Translation.
Decision to Grant dated Jul. 14, 2020, received for JP Application 2020-535264, 5 pages including English Translation.

* cited by examiner

TIME SYNCHRONIZATION SYSTEM, MASTER STATION, AND TIME SYNCHRONIZATION METHOD

CROSS-REFERENCE TO RELATED APPLICATION

The present application is based on PCT filing PCT/JP2020/007300, filed Feb. 25, 2020, the entire contents of which are incorporated herein by reference.

TECHNICAL FIELD

The present disclosure relates to a time synchronization system, a master station, and a time synchronization method.

BACKGROUND ART

As means for high-accuracy time synchronization of devices on a network, a precision time protocol (PTP) defined by Institute of Electrical and Electronics Engineers (IEEE) 1588 is known. According to this protocol, time synchronization is achieved by periodic communication of time synchronization frames between a master station having a reference time and slave stations subordinate to the master station, and correction by the slave stations of times thereof to the reference time of the master station.

The time synchronization frames transmitted from the slave stations to the master station are transmitted from the respective slave stations at freely-selected timings. Thus, an increase in the number of the slave stations connected to the master station leads to an increase in the possibility that a frame loss occurs due to overlap of transmission timings at which the time synchronization frames are transmitted from the slave stations to the master station, resulting in a decrease in time synchronization accuracy.

Patent Literature 1 discloses a technique for preventing such decrease in time synchronization accuracy by a master station managing, for each slave station, a transmittable segment that is a timing at which the slave station transmits a time synchronization frame.

CITATION LIST

Patent Literature

Patent Literature 1: Unexamined Japanese Patent Application Publication No. 2014-32055

SUMMARY OF INVENTION

Technical Problem

However, in a case in which, for example, a master station and multiple slave stations are connected via a relay device such as a switching hub, a fixed delay time is generated that is a time generated regularly at every relaying by the relay device of the time synchronization frame transmitted from each of the multiple slave stations to the master station. Further, in a case in which one time synchronization frame contends with another time synchronization frame and transmission of the other time synchronization frame from the same port is already started, a contention delay time that is a time to wait for completion of the transmission is generated, resulting in occurrence of further delay. Thus, the time synchronization accuracy may possibly decrease even in a case of adjusting the transmission timings at which the time synchronization frames are transmitted from the slave stations, since accurately calculating a propagation delay time is difficult due to increase, fluctuation or the like in the delay time generated during relay processing.

The present disclosure is made in view of the aforementioned circumstances, and an objective of the present disclosure is to improve accuracy in time synchronization between a master station and slave stations.

Solution to Problem

To achieve the aforementioned objective, a time synchronization system according to the present disclosure includes a master station and slave stations communicably connected to the master station. The master station includes contention determination means and time synchronization frame processing means. The contention determination means determines, based on receipt timings of a plurality of first time synchronization frames transmitted from the respective slave stations, whether the plurality of first time synchronization frames have a possibility of contention over relay processing. The time synchronization frame processing means discards, when the contention determination means determines that the plurality of first time synchronization frames have the possibility of the contention, out of first time synchronization frames that have a possibility of mutual contention, a first time synchronization frame received later.

Advantageous Effects of Invention

In the time synchronization system according to the present disclosure, the master station (i) determines, based on the receipt timings of the plurality of first time synchronization frames transmitted from the respective slave stations, whether the plurality of first time synchronization frames have a possibility of contention over relay processing, and (ii) discards, when determining that the possibility of the contention exists, out of time synchronization frames that have a possibility of mutual contention, a time synchronization frame received later. This configuration prevents executing time synchronization based on a time synchronization frame with an extended delay time, and thus enables improvement in accuracy of time synchronization between the master station and the slave stations.

DESCRIPTION OF EMBODIMENTS

Hereinafter, an embodiment of the present disclosure is described in detail with reference to the drawings.

Figure 1:
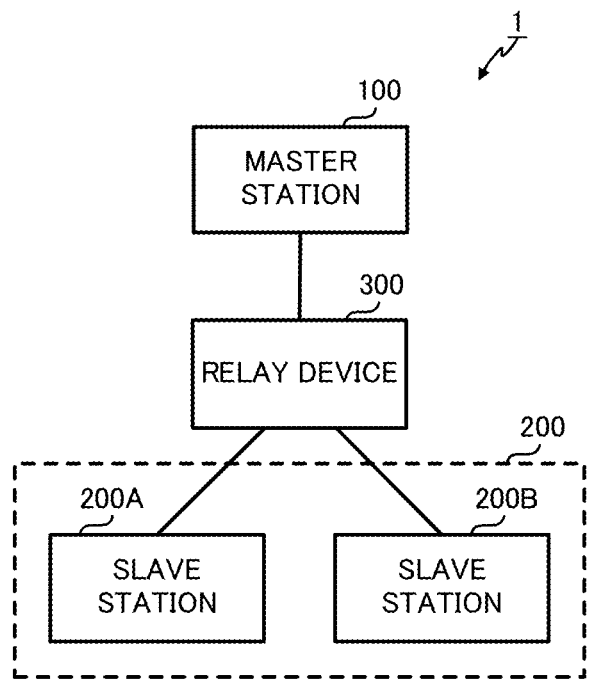
FIG. 1 is a block diagram illustrating configuration of a time synchronization system according to an embodiment.

As illustrated in FIG. 1, a time synchronization system 1 according to the embodiment of the present disclosure includes a master station 100 that performs overall control of the time synchronization system 1, slave stations 200A and 200B that are subordinate to the master station 100, and a relay device 300 that relays communication between the master station 100 and the slave stations 200A and 200B. The master station 100 and the relay device 300, and the relay device 300 and the slave stations 200A and 200B, are communicably connected to each other via a wired network line. The master station 100 and the slave stations 200A and 200B perform time synchronization by giving and receiving a time synchronization frame that conforms to the IEEE 1588 PTP standard.

Although the present embodiment describes an example in which the time synchronization system 1 includes two slave stations 200A and 200B, the time synchronization system 1 may include three or more slave stations. In the explanation below, the slave station 200A and the slave station 200B are also called the "slave stations 200" when distinction between these slave stations is unnecessary.

Hardware Configuration of the Master Station 100

Figure 2:
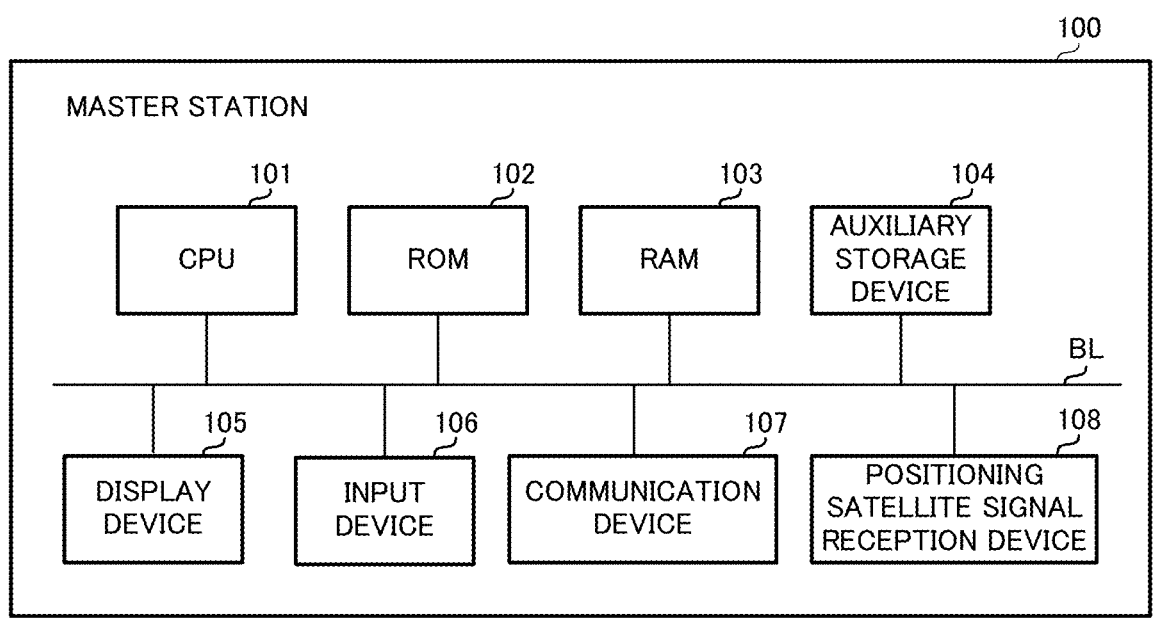
FIG. 2 is a block diagram illustrating hardware configuration of a master station.

As illustrated in FIG. 2, the master station 100 physically includes a central processing unit (CPU) 101, a read only memory (ROM) 102, a random access memory (RAM) 103, an auxiliary storage device 104, a display device 105, an input device 106, and a communication device 107. These elements are electrically interconnected via a bus line BL.

The CPU 101 is a processing device that reads out programs stored in the ROM 102 or the auxiliary storage device 104 to the RAM 103 for execution to achieve various functions of the master station 100. The CPU 101 executes, for example, time synchronization processing for time synchronization between the master station 100 and the slave stations 200.

The ROM 102 is a nonvolatile memory that stores various programs executed by the CPU 101, various types of fixed data used in execution of the programs, and the like.

The RAM 103 is a volatile memory that temporarily holds a program and data read out from the ROM 102 or the auxiliary storage device 104, and is used by the CPU 101 as a work area.

The auxiliary storage device 104 is a nonvolatile storage device whose storage content is rewritable, such as a hard disk drive (HDD) and a solid state drive (SSD). The auxiliary storage device 104 stores, for example, programs to be executed by the CPU 101, data used in execution of the programs, and data generated by execution of the programs.

The display device 105 is an image display device such as a liquid crystal display (LCD), a plasma display panel (PDP), and an organic electro-luminescence (EL) display, and displays various images in accordance with control by the CPU 101.

The input device 106 is an operation input device such as a keyboard, a mouse, and a push-button, receives various operations from a user, and supplies to the CPU 101 an operation signal based on the received operation. The input device 106 may be a touch panel that includes a display screen of the display device 105 and a touch sensor disposed so as to overlap the display screen. In this case, the input device 106 supplies to the CPU 101 an operation signal based on a result of detection by the touch sensor, such as a contact position and a contacting condition that correspond to an action by the user contacting the touch panel.

The communication device 107 is a communication interface for communication with the slave stations 200. The communication device 107 transmits and receives various types of data to and from the slave stations 200 via the relay device 300 in accordance with the control by the CPU 101.

A positioning satellite signal reception device 108 is a communication interface that receives a positioning satellite signal from a positioning satellite in the Global Positioning System (GPS), the Global Navigation Satellite System (GLONASS), or the like. The positioning satellite signal includes a time at which the positioning satellite transmits the positioning satellite signal.

Functional Configuration of the Master Station 100

Figure 3:
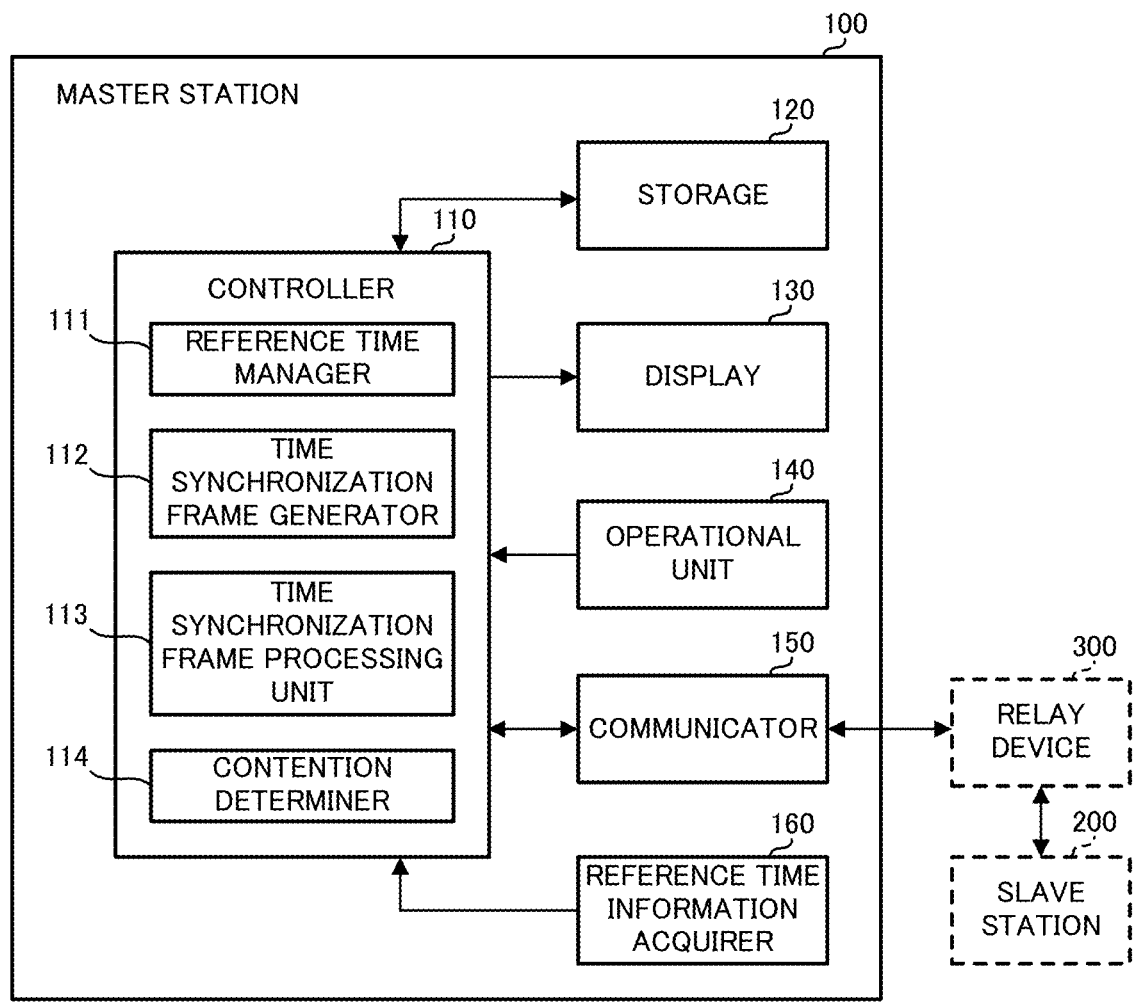
FIG. 3 is a block diagram illustrating functional configuration of the master station.

As illustrated in FIG. 3, the master station 100 functionally includes a controller 110, a storage 120, a display 130, an operational unit 140, a communicator 150, and a reference time information acquirer 160.

The controller 110 includes the CPU 101, the ROM 102, the RAM 103, and the like, and controls each element of the master station 100 by the CPU 101 reading out various control programs stored in the ROM 102 or the storage 120 and executing the control program in the RAM 103. The controller 110 includes a reference time manager 111, a time synchronization frame generator 112, a time synchronization frame processing unit 113, and a contention determiner 114.

The reference time manager 111 manages a reference time for time synchronization between the master station 100 and the slave stations 200. The reference time manager 111 generates the reference time serving as a reference for time synchronization based on, for example, time information included in a GPS signal received by the reference time information acquirer 160, and manages the reference time.

The time synchronization frame generator 112 generates a time synchronization frame that includes a message to be transmitted to the slave stations 200. The time synchronization frame generator 112 generates, for example, time synchronization frames that each include a Sync message, a Follow-Up message, and a Delay_Resp message. In the explanation below, the time synchronization frame that includes the Sync message is also simply called the "Sync message". Similarly, the time synchronization frame that includes the Follow-Up message is also called the "Follow-Up message", and time synchronization frame that includes the Delay_Resp message is also called the "Delay_Resp message".

The time synchronization frame processing unit 113 executes various types of processing relating to the time synchronization frame. For example, the time synchronization frame processing unit 113 controls the communicator 150 to transmit to the slave stations 200 the time synchronization frame generated by the time synchronization frame generator 112. Additionally, the time synchronization frame processing unit 113 stores, in the RAM 103, time information included in the time synchronization frames received from the slave stations 200 via the communicator 150.

Further, when determining that the time synchronization frame received from the slave station 200A and the time synchronization frame received from the slave station 200B the time synchronization have a possibility of mutual contention over relay processing executed by the relay device 300, the time synchronization frame processing unit 113 discards, out of the time synchronization frames that have the possibility of mutual contention, a time synchronization frame received later. Among the time synchronization frames that have the possibility of mutual contention over the relay processing executed by the relay device 300, a time synchronization frame received earlier by the master station 100 is a frame transmitted from the relay device 300 after lapse of a fixed delay time that is generated regularly. In contrast, with regard to the time synchronization frame received later by the master station 100, in addition to the fixed delay time, a contention delay time for waiting completion of transmission of the time synchronization frame transmitted earlier from the same port is generated. This increases an error with respect to a transmission time of the slave station 200 that is included in the time synchronization frame received later by the master station 100, and since executing time synchronization based on this time synchronization frame decreases time synchronization accuracy, the time synchronization frame processing unit 113 discards the time synchronization frame received later. The time synchronization frame processing unit 113 is an example of time synchronization frame processing means.

The contention determiner 114 determines, based on receipt timings of the time synchronization frames received from each of the slave station 200A and the slave station 200B, whether these time synchronization frames have a possibility of mutual contention over the relay processing executed by the relay device 300. For example, when a time interval between a time of receipt of the time synchronization frame from the slave station 200A and a time of receipt of the time synchronization frame from the slave station 200B is shorter than a predetermined fixed interval, the contention determiner 114 determines that the time synchronization frames have a possibility of mutual contention. Conversely, when the time interval between the time of receipt of the time synchronization frame from the slave station 200A and the time of receipt of the time synchronization frame from the slave station 200B is longer than the predetermined fixed interval, the contention determiner 114 determines that the time synchronization frames have no possibility of contention. The contention determiner 114 is an example of contention determination means.

The storage 120 is achieved by the auxiliary storage device 104 and stores various programs to be executed by the controller 110 and various types of data such as input data and transmission/receipt data.

The display 130 is achieved by the display device 105 and displays various images on the display screen in accordance with control by the controller 110.

The operational unit 140 is achieved by the input device 106 and receives an operation from the user, input of various types of data, or the like. The operational unit 140 generates, and supplies to the controller 110, the operation signal based on the received operation.

The communicator 150 is achieved by the communication device 107 and transmits and receives data to and from the slave stations 200 via the relay device 300 in accordance with the control by the controller 110. For example, the communicator 150 communicates the time synchronization frame with the slave stations 200.

The reference time information acquirer 160 is achieved by the positioning satellite signal reception device 108 and acquires reference time information indicating a reference time serving as a reference for time synchronization with the slave stations 200. For example, the reference time information acquirer 160 acquires, as the reference time information, time information included in a positioning satellite signal from a positioning satellite such as a GPS satellite and a GLONASS satellite. Means for acquiring the reference time information is not limited to means for receiving a satellite radio wave from the positioning satellite, and alternatively the reference time information may be acquired by, for example, receiving a standard radio wave and time signal transmitted from a ground transmitting station.

Hardware Configuration of the Slave Stations 200

Figure 4:
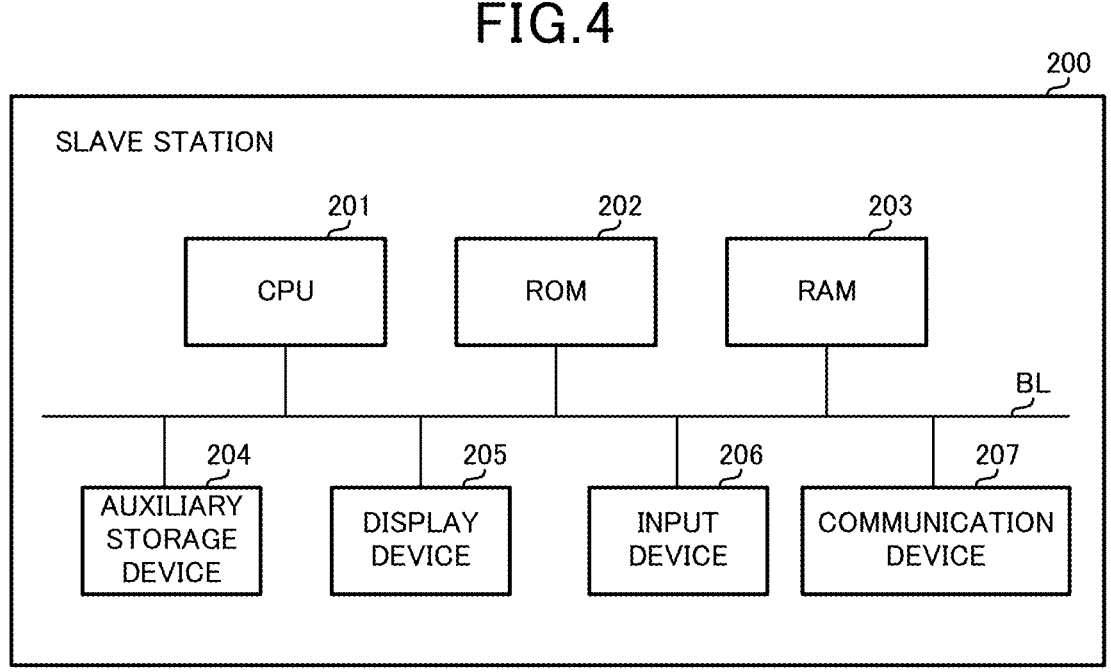
FIG. 4 is a block diagram illustrating hardware configuration of each of slave stations.

As illustrated in FIG. 4, each of the slave stations 200 physically includes a CPU 201, a ROM 202, a RAM 203, an auxiliary storage device 204, a display device 205, an input device 206, and a communication device 207. These elements are electrically interconnected via a bus line BL.

The CPU 201 is a processing device that reads out programs stored in the ROM 202 or the auxiliary storage device 204 to the RAM 203 and executes to achieve various functions of the slave station 200. The CPU 201 executes, for example, time synchronization processing for time synchronization between the master station 100 and the slave station 200.

The ROM 202 is a nonvolatile memory that stores various programs executed by the CPU 201, various types of fixed data used in execution of the programs, and the like. The ROM 202 stores, for example, a threshold of a receipt waiting time that is described later.

The RAM 203 is a volatile memory that temporarily holds a program and data, read out from the ROM 202 or the auxiliary storage device 204, and is used by the CPU 201 as a work area.

The auxiliary storage device 204 is a nonvolatile storage device whose storage content is rewritable, such as an HDD and an SSD. The auxiliary storage device 204 stores, for example, programs to be executed by the CPU 201, data used in execution of the programs, and data generated by execution of the programs.

The display device 205 is an image display device such as an LCD, a PDP, and an organic EL display, and displays various images in accordance with control by the CPU 201.

The input device 206 is an operation input device such as a keyboard, a mouse, and a switching button, receives various operations from a user, and supplies to the CPU 201 an operation signal based on the received operation. The input device 206 may be a touch panel that includes a display screen of the display device 205 and a touch sensor disposed so as to overlap the display screen. In this case, the input device 206 supplies to the CPU 201 an operation signal based on a result of detection by the touch sensor, such as a contact position and a contacting condition that correspond to an action by the user contacting the touch panel.

The communication device 207 is a communication interface for communication with the master station 100. The communication device 207 transmits and receives various types of data to and from the master station 100 via the relay device 300 in accordance with the control by the CPU 201.

Functional Configuration of the Slave Stations 200

Figure 5:
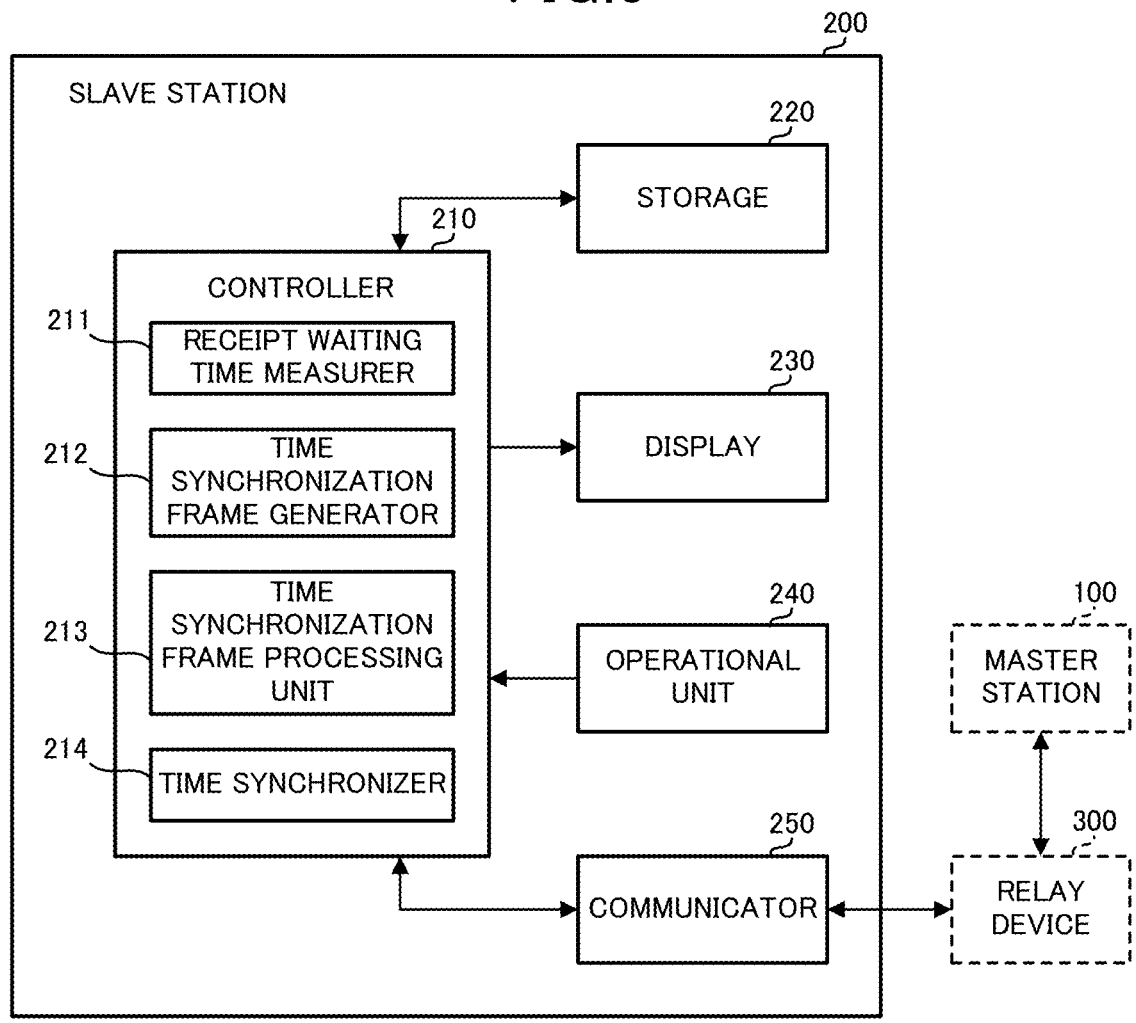
FIG. 5 is a block diagram illustrating functional configuration of each of the slave stations.

As illustrated in FIG. 5, each of the slave stations 200 functionally includes a controller 210, a storage 220, a display 230, an operational unit 240, and a communicator 250.

The controller 210 includes the CPU 201, the ROM 202, the RAM 203, and the like, and controls each element of the slave station 200 by the CPU 201 reading out various control programs stored in the ROM 202 or the storage 220 and executing the control program in the RAM 203. The controller 210 includes a receipt waiting time measurer 211, a time synchronization frame generator 212, a time synchronization frame processing unit 213, and a time synchronizer 214.

The receipt waiting time measurer 211 measures the receipt waiting time that is a time period from transmission of the time synchronization frame including a Delay_Req message to the master station 100 until receipt of the time synchronization frame including the Delay_Resp message as a response to the Delay_Req message. The receipt waiting time measurer 211 is an example of receipt waiting time measurement means. The time synchronization frame including the Delay_Req message is an example of a first time synchronization frame.

The time synchronization frame generator 212 generates the time synchronization frame including a message to be transmitted to the master station 100. For example, the time synchronization frame generator 212 generates the time synchronization frame including the Delay_Req message. In the explanation below, the time synchronization frame that includes the Delay_Req message is also simply called the "Delay_Req message".

The time synchronization frame processing unit 213 executes various types of processing relating to the time synchronization frame. For example, the time synchronization frame processing unit 213 controls the communicator 250 to transmit to the master station 100 the time synchronization frame generated by the time synchronization frame generator 212. The time synchronization frame processing unit 213 stores, in the RAM 203, information of a time of transmission of the time synchronization frame. Additionally, the time synchronization frame processing unit 213 stores, in the RAM 203, time information included in the time synchronization frame received from the master station 100 via the communicator 250. Further, when the time synchronization frame including the Delay_Resp message is not received from the master station 100 after the time synchronization frame including the Delay_Req message is transmitted to the master station 100 until the receipt waiting time measured by the receipt waiting time measurer 211 exceeds a predetermined threshold, the time synchronization frame processing unit 213 retransmits the time synchronization frame including the Delay_Req message to the master station 100. The time synchronization frame that is transmitted from the master station 100 and includes the Delay_Resp message is an example of a second time synchronization frame. The time synchronization frame processing unit 213 is an example of second time synchronization frame processing means.

The time synchronizer 214 calculates a propagation delay time between the master station 100 and the local station based on the time information obtained by giving and receiving the time synchronization frame to and from the master station 100, and corrects a time of the local station based on the calculated propagation delay time. In this manner, the time synchronizer 214 synchronizes the time of the local station with the master station 100. A method for calculating the propagation delay time is described later.

Relay Device 300

The relay device 300 is, for example, a general-purpose switching hub, and relays communication between the master station 100 and the slave stations 200.

Figure 6:
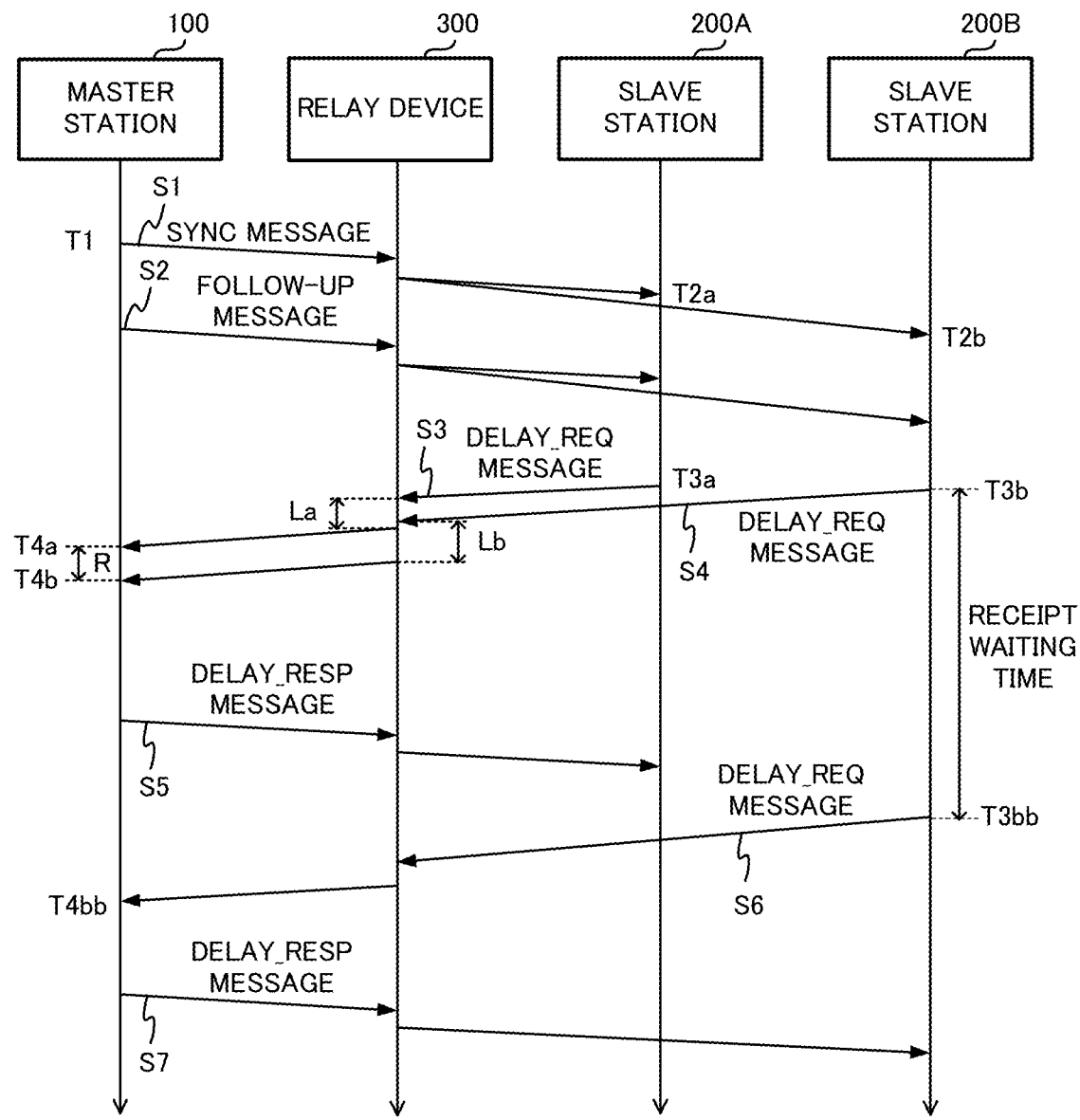
FIG. 6 is a sequence diagram illustrating processes for time synchronization between the master station and the slave stations.

Next, operation of the time synchronization system 1 to transmit and receive the time synchronization frame is described with reference to the sequence diagram illustrated in FIG. 6.

First, the master station 100 performs multicast transmission of the Sync message to the slave stations 200 (step S1). At this time, the master station 100 stores a transmission time T1 that is a time of transmission of the Sync message.

The relay device 300 transmits the Sync message received from the master station 100 to each of the slave station 200A and the slave station 200B. The relay device 300 requires, to transmit the Sync message to the slave station 200A and the slave station 200B after receipt of the Sync message, a regular fixed delay time that is generated regularly due to internal processing by the relay device 300.

The slave station 200A, upon receiving the Sync message, stores a receipt time T2$a$ that is a time at which the Sync message is received. Similarly, the slave station 200B, upon receiving the Sync message, stores a receipt time T2$b$ that is a time at which the Sync message is received.

Then the master station 100 performs multicast transmission to the slave stations 200 of the Follow-Up message including the transmission time T1 of the Sync message (step S2).

The relay device 300 transmits the Follow-Up message received from the master station 100 to each of the slave station 200A and the slave station 200B. Similarly to the relaying of the Sync message, the relay device 300 requires the regular fixed delay time to transmit the Follow-Up message to the slave station 200A and the slave station 200B after receipt of the Follow-Up message.

The slave station 200A, upon receiving the Follow-Up message, stores the transmission time T1 of the Sync message that is included in the Follow-Up message. A similar process is executed by the slave station 200B.

Then the slave station 200A transmits the Delay_Req message to the master station 100 (step S3). At this time, the slave station 200A stores a transmission time T3$a$ that is a time at which the Delay_Req message is transmitted. Further, the slave station 200B transmits the Delay_Req message to the master station 100 (step S4). At this time, the slave station 200B stores a transmission time T3$b$ that is a time at which the Delay_Req message is transmitted. The transmission time T3$a$ is taken to be earlier than the transmission time T3$b$.

The relay device 300 starts the relay processing upon receiving the Delay_Req messages transmitted from the slave station 200A and the slave station 200B. Here, the Delay_Req message from the slave station 200B that is transmitted from a port that is also used for transmission of the Delay_Req message from the slave station 200A is kept waiting until completion of the relay processing for relaying the Delay_Req message from the slave station 200A. Due to this, a delay time Lb of the Delay_Req message from the slave station 200B is longer than a delay time La of the Delay_Req message from the slave station 200A.

The master station 100, upon receiving via the relay device 300 the Delay_Req messages transmitted from the slave station 200A and the slave station 200B, stores receipt times T4$a$ and T4$b$ at which the Delay_Req messages are received. When an interval R between the receipt time T4$a$ of the Delay_Req message and the receipt time T4$b$ of the Delay_Req message is shorter than a predetermined fixed interval, the master station 100 determines that these Delay_Req messages have a possibility of mutual contention over the relay processing executed by the relay device 300, and discards the Delay_Req message from the slave station 200B that is received later.

Then the master station 100 performs unicast transmission to the slave station 200A of the Delay_Resp message including the receipt time T4$a$ of the Delay_Req message (step S5). The slave station 200A, upon receiving the Delay_Resp message, stores the receipt time T4$a$ of the Delay_Req message that is included in the Delay_Resp message.

When the Delay_Resp message is not received from the master station 100 until a predetermined reception waiting time elapses after transmission of the Delay_Req message to the master station 100, the slave station 200B retransmits the Delay_Req message to the master station 100 (step S6). At this time, the slave station 200B stores a transmission time T3$bb$ at which the Delay_Req message is transmitted.

The master station 100, upon receiving the Delay_Req message retransmitted from the slave station 200B via the relay device 300, stores the receipt time T4$bb$ of the Delay_Req message. Since no Delay_Req message exists that has a possibility of contention with the Delay_Req message from the slave station 200B, the master station 100 performs unicast transmission to the slave station 200B of the Delay_Resp message including the receipt time T4$bb$ of the Delay_Req message (step S7).

The slave station 200A, upon receiving the Delay_Resp message, stores the receipt time T4$bb$ of the Delay_Req message that is included in the Delay_Resp message.

By the operations described above, the slave station 200A acquires the transmission time T1 of the Sync message, the receipt time T2$a$ of the Sync message, the transmission time T3$a$ of the Delay_Req message, and the receipt time T4$a$ of the Delay_Req message. The slave station 200A can calculate a propagation delay time Da by, for example, Da=((T4$a$−T1)−(T3$a$−T2$a$))/2. Further, an offset value Ea that is a difference between the time of the master station 100 and the time of the slave station 200A is calculatable by, for example, Ea=(T2$a$−T1)−Da.

The slave station 200B acquires the transmission time T1 of the Sync message, the receipt time T2$b$ of the Sync message, the transmission time T3$bb$ of the Delay_Req message, and the receipt time T4$bb$ of the Delay_Req message. The slave station 200B can calculate a propagation delay time db by, for example, db=((T4$bb$−T1)−(T3$bb$−T2$b$))/2. Further, an offset value Eb for time synchronization is calculatable by, for example, Eb=(T2$b$−T1)−db.

In the explanation below, the elements relating to the slave station 200A and the slave station 200B, that is, the receipt times of the Sync message, the transmission times of the Delay_Req message, the receipt times of the Delay_Req message, the propagation delay times, and the offset values, are represented without an index such as "a" and "b" when distinction by use of such index is unnecessary.

Figure 7:
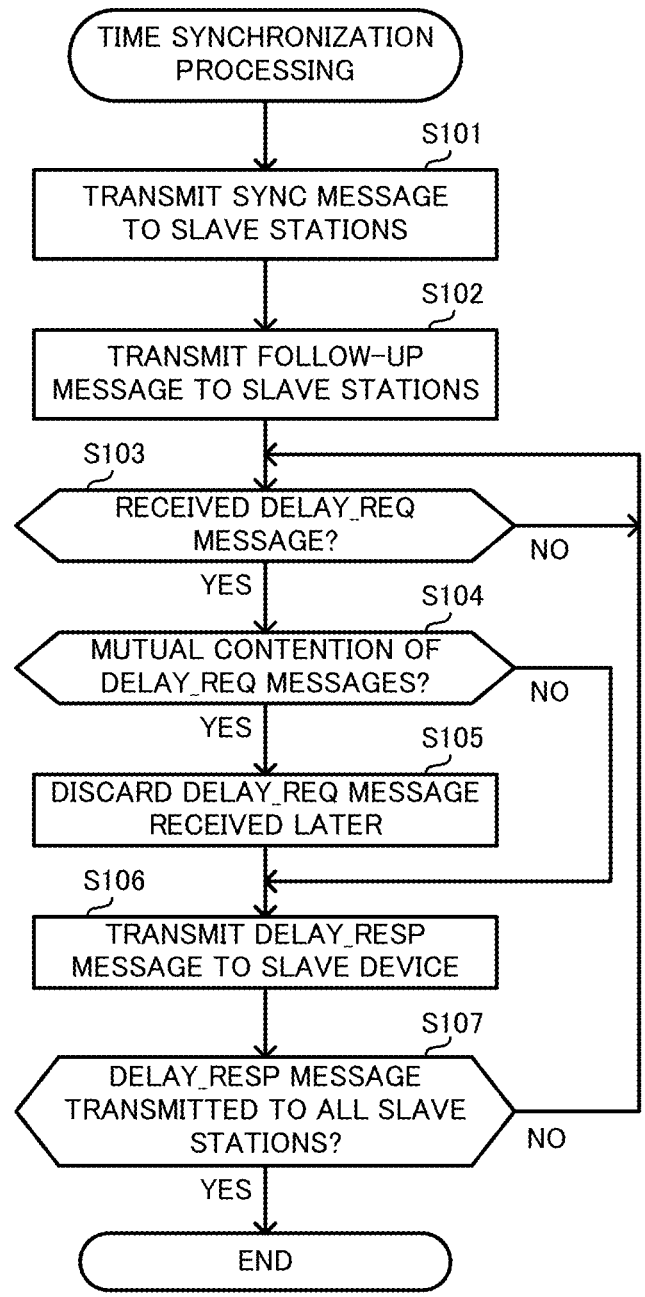
FIG. 7 is a flowchart illustrating a flow of time synchronization processing executed by the master station.

Next, the time synchronization processing executed by the controller 110 of the master station 100 is described with reference to the flowchart illustrated in FIG. 7. The time synchronization processing by the master station 100 is processing for executing high-accuracy time synchronization through identification of a valid time synchronization frame from the slave stations 200. The controller 110 starts the time synchronization processing in response to, for example, arrival of an execution cycle of the time synchronization.

Upon starting the time synchronization processing, the controller 110 firstly transmits the Sync message to the slave stations 200 (step S101). The time synchronization frame processing unit 113 of the controller 110 controls the communicator 150 to transmit to the slave stations 200 the Sync message generated by the time synchronization frame generator 112. At this time, the time synchronization frame processing unit 113 stores the transmission time T1 of the Sync message in, for example, the RAM 103.

Then the controller 110 transmits the Follow-Up message to the slave stations 200 (step S102). The time synchronization frame processing unit 113 controls the communicator 150 to transmit to the slave stations 200 the Follow-Up message generated by the time synchronization frame generator 112. This Follow-Up message includes time information indicating the transmission time T1 of the Sync message. The slave stations 200 can acquire the transmission time T1 of the Sync message by receiving the Follow-Up message.

Then the controller 110 determines whether the Delay_Req message is received from the slave stations 200 (step S103). The time synchronization frame processing unit 113 performs the determination depending on whether the communicator 150 receives the Delay_Req message from at least one of the slave stations 200. Upon determining that the Delay_Req message is not received from the slave stations 200 (NO in step S103), the controller 110 repeats the processing in step S103 until the Delay_Req message is received.

Conversely, upon determining that the Delay_Req message is received from the slave stations 200 (YES in step S103), the controller 110 determines whether the Delay_Req messages have a possibility of mutual contention over the relay processing executed by the relay device 300 (step S104). When, for example, a difference between the receipt times of the Delay_Req messages received from mutually different slave stations 200, that is, a time interval between the receipt times of these Delay_Req messages, is smaller than the predetermined fixed interval, the contention determiner 114 of the controller 110 determines that these Delay_Req messages have a possibility of mutual contention over the relay processing executed by the relay device 300.

Upon determining that the Delay_Req messages have the possibility of mutual contention (YES in step S104), the controller 110 discards, out of the Delay_Req messages that have the possibility of mutual contention, a Delay_Req message received later (step S105).

Upon determining in step S104 that the Delay_Req messages have no possibility of mutual contention (NO in step S104), or after executing the processing in step S105, the controller 110 transmits the Delay_Resp message to (i) the slave stations 200 that are transmission sources of the Delay_Req messages determined to not have a possibility of mutual contention or (ii) a slave station 200 that is a transmission source of the Delay_Req message that has a possibility of contention but is received earlier (step S106). The time synchronization frame processing unit 113 controls the communicator 150 to transmit to such slave stations 200 the Delay_Resp message generated by the time synchronization frame generator 112. This Delay_Resp message includes time information indicating the receipt time T4 of the Delay_Req message. The slave stations 200 can acquire the receipt time T4 of the Delay_Req message by receiving the Delay_Resp message.

After executing the processing in step S106, the controller 110 determines whether the Delay_Resp message is transmitted to all of the slave stations 200 in the time synchronization system 1 (step S107). Upon determining that a slave station 200 to which the Delay_Resp message is not yet transmitted exists (NO in step S107), the controller 110 returns the processing the step S103 and waits until the Delay_Req message is received.

Conversely, upon determining that the Delay_Resp message is transmitted to all of the slave stations 200 in the time synchronization system 1 (YES in step S107), the controller 110 ends the time synchronization processing.

Figure 8:
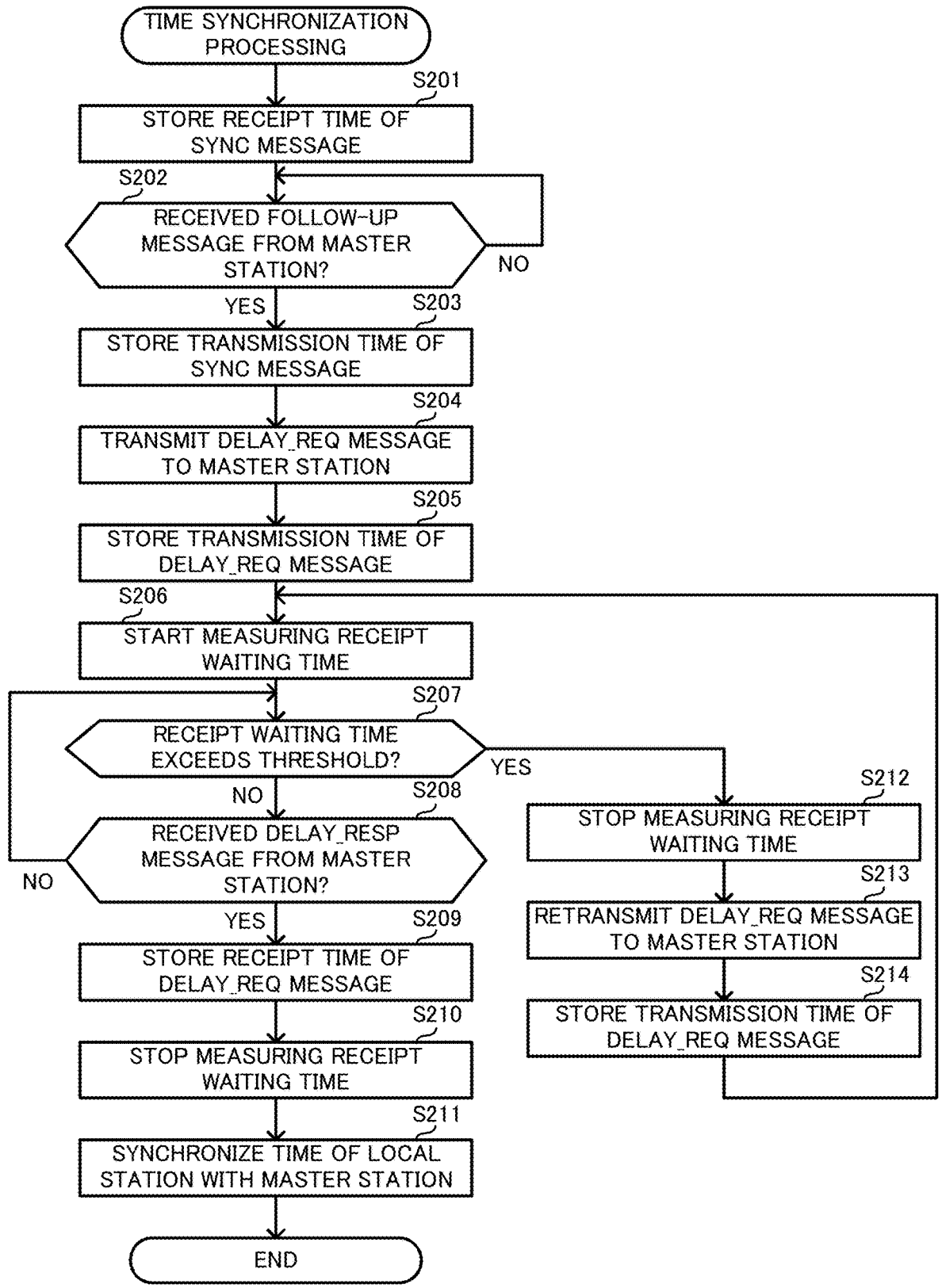
FIG. 8 is a flowchart illustrating a flow of time synchronization processing executed by each of the slave stations.

Next, the time synchronization processing executed by the controller 210 of each of the slave stations 200 is described with reference to the flowchart illustrated in FIG. 8. The time synchronization processing by the slave stations 200 is processing for reliably acquiring information necessary for time synchronization from the master station 100 even in the case in which the time synchronization frame transmitted to the master 100 is discarded due to a possibility of contention with other time synchronization frame. The controller 210 starts the time synchronization processing upon receiving the Sync message from the master station 100.

Upon starting the time synchronization processing, the controller 210 firstly stores the receipt time T2 of the Sync message (step S201). The time synchronization frame processing unit 213 of the controller 210 stores the receipt time T2 of the Sync message transmitted from the master station 100 in, for example, the RAM 203.

Then the controller 210 determines whether the Follow-Up message is received from the master station 100 (step S202). The time synchronization frame processing unit 213 performs the determination depending on whether the communicator 250 receives the Follow-Up message from the master station 100. Upon determining that the Follow-Up message is not received from the master station 100 (NO in step S202), the controller 210 repeats the processing in step S202 until the Follow-Up message is received.

Conversely, upon determining that the Follow-Up message is received from the master station 100 (YES in step S202), the controller 210 stores the transmission time T1 of the Sync message that is included in the Follow-Up message (step S203). The time synchronization frame processing unit 213 stores in, for example, the RAM 203, the transmission time T1 that is included in the Follow-Up message and is a time at which the master station 100 transmits the Sync message.

Then the controller 210 transmits the Delay_Req message to the master station 100 (step S204). The time synchronization frame processing unit 213 controls the communicator 250 to transmit to the master station 100 the Delay_Req message generated by the time synchronization frame generator 212. Then the time synchronization frame processing unit 213 stores the transmission time T3 of the Delay_Req message in the RAM 203 (step S205).

After executing the processing in step S205, the controller 210 starts measuring the receipt waiting time (step S206). The receipt waiting time measurer 211 measures the receipt waiting time that is a time period to wait for the Delay_Resp message transmitted from the master station 100 in response to the Delay_Req message based on, for example, a counter value of the CPU 201.

Then the controller 210 determines whether the receipt waiting time exceeds the predetermined threshold (step S207). The receipt waiting time measurer 211 performs the determination depending on, for example, whether the counter value of the CPU 201 that is counted from the start of the measurement of the receipt waiting time exceeds the predetermined threshold.

Upon determining that the receipt waiting time does not exceed the predetermined threshold (NO in step S207), the controller 210 determines whether the Delay_Resp message is received from the master station 100 (step S208). The time synchronization frame processing unit 213 performs the determination depending on whether the communicator 250 receives the Delay_Resp message from the master station 100. Upon determining that the Delay_Resp message is not received from the master station 100 (NO in step S208), the controller 210 returns the processing to step S207.

Upon determining that the Delay_Resp message is received from the master station 100 (YES in step S208), the controller 210 stores the receipt time T4 of the Delay_Req message that is included in the Delay_Resp message (step S209). The time synchronization frame processing unit 213 stores, in the RAM 203, for example, the receipt time T4 that is included in the Delay_Resp message and is a time at which the master station 100 receives the Delay_Req message.

Then the controller 210 stops measuring the receipt waiting time (step S210). The receipt waiting time measurer 211 stops, for example, the measuring of the receipt waiting time based on the counter value of the CPU 201 upon receiving the Delay_Resp message from the master station 100.

Then the controller 210 synchronizes the time of the local station with the master station 100 (step S211). The time synchronizer 214 corrects the time of the local station by, as described above, calculating the propagation delay time D and the offset value E based on, for example, the transmission time T1 of the Sync message, the receipt time T2 of the Sync message, the transmission time T3 of the Delay_Req message, and the receipt time of T4 of the Delay_Req message that are stored in the RAM 203. In this manner, the times of the slave stations 200 become synchronized with the reference time of the master station 100. After executing time synchronization with the master station 100, the controller 210 ends the time synchronization processing.

Upon determining in step S207 that the receipt waiting time exceeds the threshold (YES in step S207), the controller 210 stops measuring the receipt waiting time (step S212), and retransmits the Delay_Req message to the master station 100 (Step S213). That is to say, in the case in which the Delay_Resp message is not received from the master station 100 until the receipt waiting time exceeds the threshold, a possibility exists that the Delay_Req message transmitted in step S205 is determined to have a possibility of contention with the Delay_Req message from other slave station 200 and is discarded as being a Delay_Req message received later by the master station 100. Thus, the controller 210 retransmits the Delay_Req message.

After retransmitting the Delay_Req message, the controller 210 returns the processing to step S206 and waits until the Delay_Resp message is received.

As described above, according to the time synchronization system 1 according to the present embodiment, the master station 100 determines whether multiple Delay_Req messages received from the slave stations 200 via the relay device 300 have a possibility of mutual contention over the relay processing executed by the relay device 300, and discards, upon determining that the received multiple Delay_ Req messages have the possibility of the mutual contention, out of the Delay_Req messages that have the possibility of mutual contention, a Delay_Req message received later. This configuration prevents executing time synchronization based on a time synchronization frame with an extended delay time, and thus enables improvement in accuracy of time synchronization between the master station and the slave stations that are connected via the relay device.

The present disclosure is not limited to the aforementioned embodiment, and various modifications and applications can be made without departing from the gist of the present disclosure.

Figure 9:
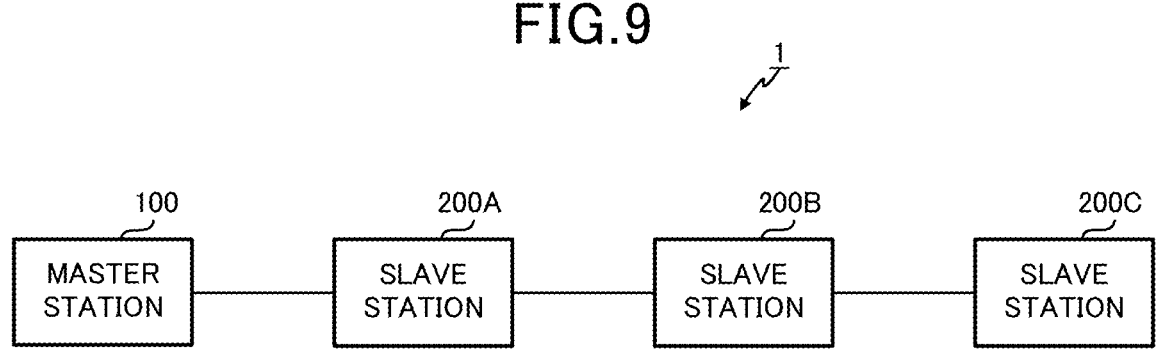
FIG. 9 is a block diagram illustrating configuration of a time synchronization system according to a modified example.

Although the time synchronization system 1 according to the aforementioned embodiment includes the master station 100, the slave stations 200, and the relay device 300 that relays communication between the master station 100 and the slave stations 200, network configuration of the time synchronization system 1 is not limited to this configuration. For example, as illustrated in FIG. 9, the time synchronization system 1 may include the master station 100 and multiple slave stations 200A, 200B, and 200C that are linked together in series through a wired network line, that is, have a linear connection configuration, so as to enable data communication. In the case of this configuration, each of the slave stations 200A, 200B, and 200C has a function for sequentially relaying a data signal, and the data signal is sequentially transferred through the slave stations 200 by successive relaying transmission and is transmitted to a destination that is the master station 100 or is one of the slave stations 200.

Figure 10:
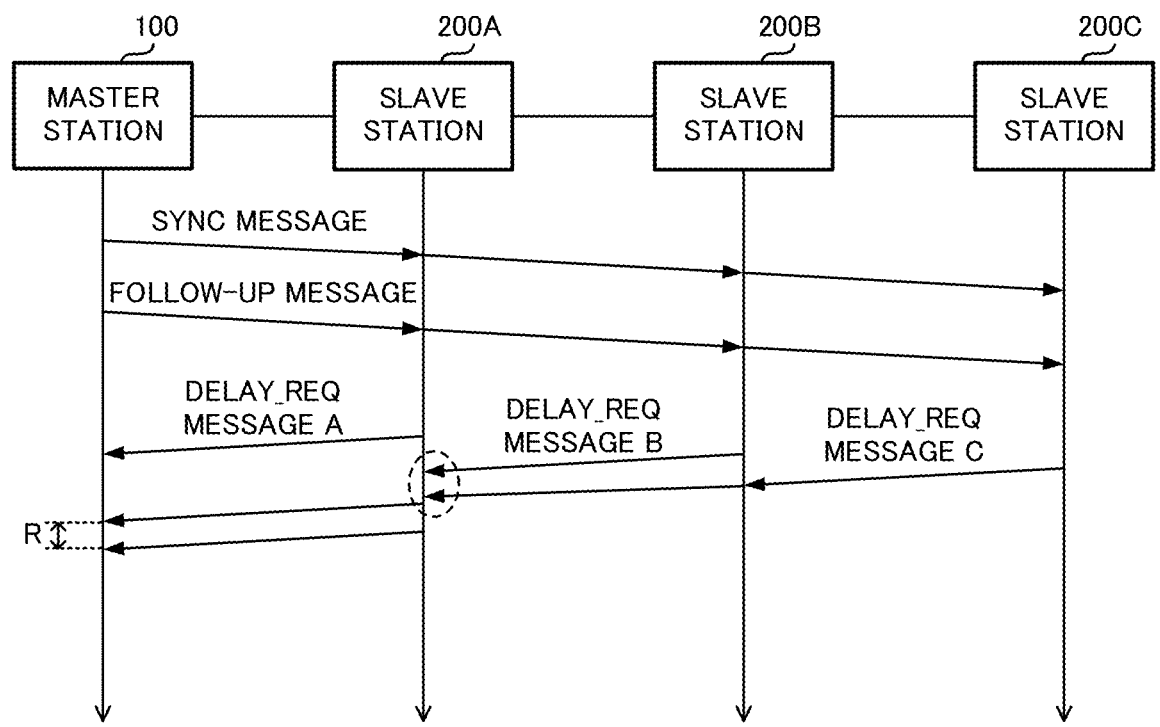
FIG. 10 is a drawing for explanation of contention of time synchronization frames in the time synchronization system according to the modified example.

More specifically, as illustrated in FIG. 10, each of the slave stations 200A, 200B, and 200C transmits to the master station 100 a corresponding one of a Delay_Req message A, a Delay_Req message B, and a Delay_Req message C, in response to the Sync message and the Follow-Up message that are received from the master station 100. When an interval R between the Delay_Req message B and the Delay_Req message C that are received via the slave station 200A that is the closest to the master station 100 is shorter than a predetermined fixed interval, the master station 100 determines that a possibility of occurrence of mutual contention over relay processing executed by the slave station 200A exists, similarly to the aforementioned embodiment. Then the master station 100 discards, out of the Delay_Req message B and the Delay_Req message C that have the possibility of mutual contention over the relay processing executed by the slave station 200A, the Delay_Req message C received later. Due to this configuration, this modified example also prevents executing time synchronization based on a time synchronization frame with an extended delay time, and thus enables improvement in accuracy of time synchronization between the master station and the slave stations that have the linear connection configuration.

In the aforementioned embodiment, the ROM 102 or the auxiliary storage device 104 stores in advance, for example, the control program to be executed by the CPU 101 included in the controller 110 of the master station 100. However, the present disclosure is not limited to this configuration, and an existing general-purpose computer, a framework, a work station, or the like, can function as a device serving as the master station 100 according to the aforementioned embodiment by installation therein of an operation program for causing execution of the aforementioned various types of processing.

Any method for providing such program may be used, and such program may be provided by distribution by storing the program in, for example, a computer-readable recording medium such as a flexible disk, a compact disc ROM (CD-ROM), a digital versatile disc ROM (DVD-ROM), or the like, or may be provided by storing the program in a storage on a network such as the Internet and allowing download of the program.

In the case of executing the aforementioned processing by allotment to an operating system (OS) and an application program, or in cooperation between the OS and the application program, storing in the recording medium and the storage of only portions of the application program is permissible. Further, the program may be distributed via a network by superimposing the program on a carrier wave. For example, the program may be distributed via a network by posting the program on a bulletin board system (BBS) on the network. Thus, a design is permissible in which the program is activated and executed under the control of the OS similarly to other application programs to execute the aforementioned processing.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Time synchronization system
100 Master station
101 CPU
102 ROM
103 RAM
104 Auxiliary storage device
105 Display device
106 Input device
107 Communication device
108 Positioning satellite signal reception device
110 Controller
120 Storage
130 Display
140 Operational unit
150 Communicator
160 Reference time information acquirer
200, 200A, 200B, 200C Slave station
201 CPU
202 ROM
203 RAM
204 Auxiliary storage device
205 Display device
206 Input device
207 Communication device
210 Controller
211 Receipt waiting time measurer
212 Time synchronization frame generator
213 Time synchronization frame processing unit
214 Time synchronizer
220 Storage
230 Display
240 Operational unit
250 Communicator
300 Relay device
BL Bus line

The invention claimed is:

1. A time synchronization system comprising:
a master station; and
slave stations communicably connected to the master station,
the master station including
first processing circuitry to
determine, based on receipt timings of a plurality of first time synchronization frames transmitted from the respective slave stations, whether the plurality of first time synchronization frames have a possibility of contention over relay processing, and
discard, when determining that the plurality of first time synchronization frames have the possibility of the contention, out of first time synchronization frames that have a possibility of mutual contention, a first time synchronization frame received later.

2. The time synchronization system according to claim 1, wherein the first processing circuitry determines that the plurality of first time synchronization frames have the possibility of the contention over the relay processing when a time interval between a time of receipt of one first time synchronization frame among the plurality of first time synchronization frames and a time of receipt of another first time synchronization frame among the plurality of first time synchronization frames is shorter than a predetermined fixed interval.

3. The time synchronization system according to claim 2, wherein
each of the slave stations includes
second processing circuitry to
measure a receipt waiting time that is a time period from transmission of the first time synchronization frame until receipt of a second time synchronization frame transmitted from the master station as a response to the first time synchronization frame, and
retransmit the first time synchronization frame to the master station when the second time synchronization frame is not received until the receipt waiting time exceeds a predetermined threshold.

4. The time synchronization system according to claim 1, wherein
each of the slave stations includes
second processing circuitry to
measure a receipt waiting time that is a time period from transmission of the first time synchronization frame until receipt of a second time synchronization frame transmitted from the master station as a response to the first time synchronization frame, and
retransmit the first time synchronization frame to the master station when the second time synchronization frame is not received until the receipt waiting time exceeds a predetermined threshold.

5. A master station communicably connected to slave stations, the master station comprising:
first processing circuitry to
determine, based on receipt timings of a plurality of first time synchronization frames transmitted from the respective slave stations, whether the plurality of first time synchronization frames have a possibility of contention over relay processing, and
discard, when determining that the plurality of first time synchronization frames have the possibility of the contention, out of first time synchronization frames that have a possibility of mutual contention, a first time synchronization frame received later.

6. A time synchronization method executed by a master station communicably connected to slave stations, the time synchronization method comprising:
determining, based on receipt timings of a plurality of first time synchronization frames transmitted from the respective slave stations, whether the plurality of first time synchronization frames have a possibility of contention over relay processing; and
discarding, when a determination is made that the plurality of first time synchronization frames have the possibility of the contention, out of first time synchronization frames that have a possibility of mutual contention, a first time synchronization frame received later.

* * * * *